United States Patent [19]

Einbinder

[11] Patent Number: 5,402,167
[45] Date of Patent: Mar. 28, 1995

[54] PROTECTIVE SURVEILLANCE SYSTEM

[75] Inventor: Eli Einbinder, New York, N.Y.

[73] Assignee: Cornell Research Foundation, Inc., Ithaca, N.Y.

[21] Appl. No.: 61,833

[22] Filed: May 13, 1993

[51] Int. Cl.⁶ .............................................. H04N 7/18
[52] U.S. Cl. .................................... 348/152; 348/143
[58] Field of Search ................. 358/108, 105; 348/143, 348/151, 152, 155

[56] References Cited

U.S. PATENT DOCUMENTS

| | | | |
|---|---|---|---|
| 4,120,004 | 10/1978 | Coutta | 348/151 |
| 4,709,897 | 12/1987 | Mooney | 348/151 |
| 4,772,875 | 9/1988 | Maddox et al. | 348/152 |
| 4,789,894 | 12/1988 | Cooper | 348/155 |
| 4,881,135 | 11/1989 | Heiweil | 358/108 |
| 4,992,867 | 2/1991 | Weinblatt | 348/151 |
| 5,034,811 | 7/1991 | Palm | 348/155 |
| 5,111,291 | 5/1992 | Erickson et al. | 348/152 |
| 5,243,476 | 9/1993 | Hong | 360/73.02 |
| 5,253,054 | 10/1993 | Jujiwara | 358/105 |

*Primary Examiner*—Tommy P. Chin
*Assistant Examiner*—A. Au
*Attorney, Agent, or Firm*—Jones, Tullar & Cooper

[57] ABSTRACT

A system for observing and recording the activity between a practitioner such as a psychiatrist or doctor and a patient includes zoom lens video camera and a microphone having output signals mixed and fed through a delay network to a high capacity tape recorder together with a date/time signal and a remote control for adjusting the recorder speed between a normal recording speed and a dormant slow frame time lapse speed. A monitor is coupled to the mixed signals and the field and orientation of the camera is remotely controlled by the practitioner. A sound or motion sensor may switch the recorder from slow speed to normal recording speed; or in other situations which so dictate, it may initiate the dormant slow frame time lapse speed—regular or random—and so remain.

1 Claim, 1 Drawing Sheet

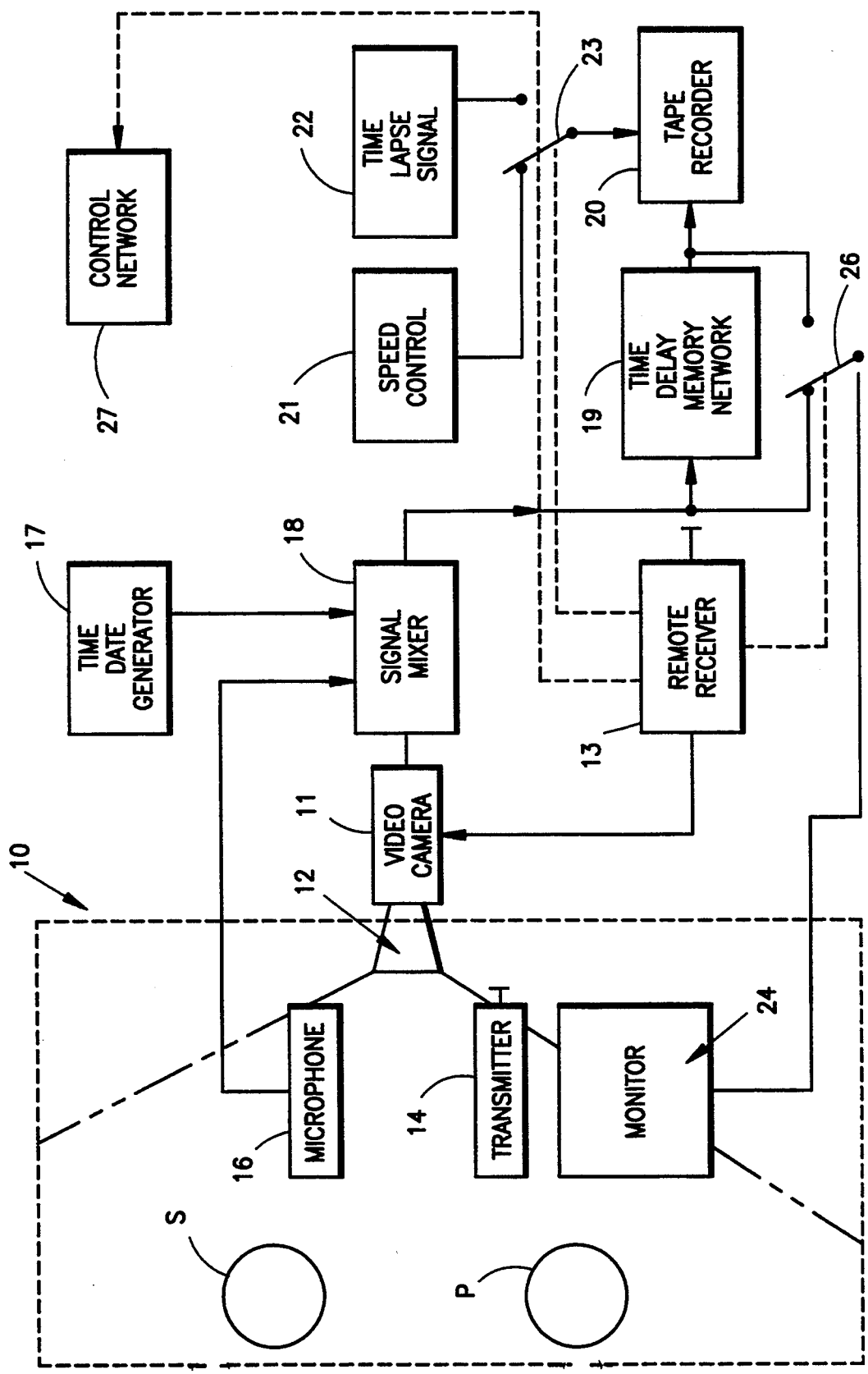

PROTECTIVE SURVEILLANCE SYSTEM

BACKGROUND OF THE INVENTION

The present invention relates generally to improvements in methods and apparatus for gathering and preserving information and it relates particularly to an improved video and audio observing and recording apparatus and method.

The practice of many activities and procedures, particularly those of a professional nature such as medicine, psychiatry, law, financial matters involving a practitioner and a subject in which the practitioner provides treatment, consultation, diagnosis, analysis and advice to the subject, the procedure is conducted in a private and confidential manner. Occasionally, controversies arise concerning the conduct and service of the practitioner which result in claims and litigation. The conduct and service complained of usually depends solely on the memories and observations of the participants and such evidence, per se, is usually perceived as being biased and not completely credible. Corroborating evidence of the events in question, particularly when established in normal practice would be very helpful in establishing the true facts, particularly when such evidence is unassailable. This in the long run would reduce the number and probability of malpractice and similar claims and litigation, the cost of malpractice insurance and the overall cost of medical services and insurance. It would also help to preserve and improve conduct and service prophylactically.

SUMMARY OF THE INVENTION

It is a principal object of the present invention to provide an improved method and apparatus for gathering and preserving information, with minimal intrusion and maximal preservation of privacy as each situation allows and dictates.

Another object of the present invention is to provide an improved method and apparatus for producing and recording video and audio information of a pre-determined field of activity.

Still another object of the present invention is to provide an improved apparatus for producing, recording and monitoring a video and audio record of the activity and interaction of a practitioner and subject which is under the control of and adjustment by the practitioner who may monitor and control the area under observation and the speed of the recorder or who may have no control whatsoever, depending on the situation.

Another object of the present invention is to provide an improved video and audio surveillance system which selects a mode of operation in response to a parameter in the observed area.

A further object of the present invention is to provide an apparatus of the above nature which is simple and unobtrusive, easily controlled by the practitioner, when so applicable during and between events in an unobtrusive manner, which records the time and date of each recording increment, which is highly efficient in the use of the recording medium, which collected information is unassailable and is of great versatility and adaptability.

A surveillance system in accordance with the present invention comprises an activity area containing a subject and a practitioner, a video camera viewing the practitioner and an audio pickup or microphone exposed to said activity area, said video camera and pickup having video and audio output signals, means for recording at adjustable speeds said output signals and control means accessible to said practitioner, when so applicable, for adjusting said recording speed.

Advantageously, the recording means is a VCR employing magnetic tape cassettes and is of adjustable tape advance speed including an active mode at a normal speed preferably an EP speed or a slower speed consistent with desired resolution and acceptable capacity and a dormant mode at a slow time lapse speed, for example, averaging between a frame a minute and several minutes and which may be randomized. Additionally, a time and date signal generator is provided which is independent of the recorder speed and applies a signal to the recorder to provide the time and date at a corner of each successive frame of the video picture. The field of the camera may cover the full activity area and may include a power zoom lens remotely controlled by the practitioner. A monitor may be provided which is accessible only to the practitioner. The recorder may be run at a normal speed or may be stopped and respond to the occupation of the activity area.

With the improved procedure and apparatus, a full permanent record may be provided of the activity and conduct of a practitioner and subject with an area of activity with no lapses, high probity and great versatility to provide unassailable evidence of the facts of a recorded event. Other situations will utilize the regular or random lapsed system to show the absence of inappropriate service while minimizing intrusion to preserve privacy.

BRIEF DESCRIPTION OF THE DRAWING

The drawing is a block diagram of an apparatus embodying the present invention.

DESCRIPTION OF THE PREFERRED EMBODIMENT

Referring to the drawing which illustrates a preferred embodiment of the present invention, the reference numeral 10 generally designates a surveillance area in which are moveably located a practitioner P, for example, a psychiatrist, medical doctor, consultant, professional or non-professional person or the like and a subject S, for example, a patient or other participant interacting with the practitioner P. The area 10 may be an office, laboratory, consulting chamber, hospital room or the like.

A video camera 11 having a motor-powered zoom lens 12 is mounted and masked so as to be normally out of sight or hidden and is preferably remotely angularly adjustable about vertical and horizontal axes to vary the direction of the optical axis of zoom lens 12. Thus, by controlling the orientation of camera 11 and the viewing field of zoom lens 12, the full surveillance area 10 may be viewed or any part thereof which may include practitioner P or subject S or both. A wireless remote-controlled receiver 13 of known construction has output signals applied to slave motor controls in camera 11 for adjusting the orientation of camera 11 and the angle of view of zoom lens 12. A button-controlled remote control transmitter 14 carried by or readily and unobtrusively accessible to the practitioner P transmits selected radio signals to receiver 13 which responds to such signals to produce the output signals to the camera 11 which control camera 11 and lens 12.

A microphone 16 is exposed to and picks up sounds in surveillance area 10 and transduces it to output electrical audio signals. A time and date signal generator 17 is constantly running to provide real time and date output signals. The output video signals from camera 11, microphone 16 and time and date generator are fed to and combined in a signal mixer network 18.

The combined signal output of signal mixer 18 is fed to the input of a signal delay network or memory 19 whose output is fed to a high capacity magnetic tape or other high capacity recorder 20 of selected variable speed. Recorder 20 is advantageously a VCR with a high capacity replaceable tape cassette which may be switched between a minimum continuous frame first speed providing suitable resolution, such as at EP speed or less and a time lapse regular or random frame speed, for example, averaging between a frame a minute and a frame per several minutes. To this end, the speed control input is alternatively connected to a normal recording speed signal generator 21 or a regular or random time lapse signal generator 22 by way of a double throw switch 23 which is controlled by remote controller 14 through controlled receiver 13.

A video monitor 24 carried by or unobtrusively located within convenient viewing by practitioner P, for example, on a desk or chair occupied by the practitioner, has its signal input connected by way of a two way switch 26 selectively alternatively to the input or output of time delay memory network 19.

As an alternative, the switch 23 may not be under the control of the practitioner but may be in the state connecting the recorder control to time lapse signal generator 22 and is switched to the normal recording speed by a control network 27 responding to motion, sound or other desired conditions sensed in area 10, preferably for a pre-determined time interval following each such sensing.

In the application and operation of the improved apparatus described above, in the dormant operational mode of the apparatus switch 23 is remotely switched by the remote controller 14 to the time lapse signal generator 22 and the field of lens 12 and the orientation of camera 11 are similarly remotely adjusted to view the full area 10. Tape recorder 20 thus operates in the time lapse mode and produces video pictures, recordings at a very slow speed of successive picture frames time separated between a few seconds and a few minutes. Each of the picture frames carries the time and date of the picture recording which appears in a corner of the picture produced by the recording.

When it is desired to produce a continuous motion picture and accompanying sound, the practitioner remotely directs the camera and adjusts the zoom lens 11 to the desired area and switches switch 23 to normal speed control 21 which latter operational mode may alternatively be effected by motion or sound in the area 10 by sensing network 27. The adjusted field of view and frame speed may be observed in monitor 24 which is alternatively connected to the input or output of time delay network 19. the camera orientation and zoom lens field may be continuously or intermittently remotely adjusted by practitioner P who may determine the adjustment by viewing monitor 24. It is desirable that the practitioner P is always in the view of lens 12 as well as may be the subject S. Upon the conclusion of the conduct of a practitioner-subject relationship, the tape recorder is switched to time lapse generator 22 until the next occurrence is to be recorded by the practitioner or under control of network 27.

Advantageously, tape recorder 20 is of the record only nonerasable type and employs a replaceable tape cassette shaped or otherwise coded to be employable only by tape recorder 20 and no other conventional tape recorder. Moreover, recorder 20 is provided with a mechanism which locks the tape cassette in an operating position and the cassette can be removed only by an authorized person having a proper key or code which may exclude the cassette replacement by the practitioner.

In addition, certain situations may necessitate the entire system being locked to the practitioner and accessible only to an authorized and security-bonded individual.

While there has been described and illustrated a preferred embodiment of the present invention, it is apparent that numerous alteration, omissions and additions may be made without departing from the spirit thereof.

I claim:

1. A surveillance system for monitoring subjects in a surveillance area to protect the subjects while preserving their privacy comprising:
   imaging means having a field of view directed to a surveillance area containing at least first and second subjects for monitoring said area and for producing sequential images of at least a part of said area and at least first said subject;
   output means connected to said imaging means and producing image signals corresponding to said images;
   a recorder having an input coupled to said output means for receiving said image signals, said recorder being operable to receive and record successive image signals selectively at a first rate or a second rate to provide a record of activity within said surveillance area;
   controller means for adjusting said recorder to record only selected image signals for protecting the privacy of said subjects;
   said controller means includes means for adjusting said recorder to record image signals at a selected rate between a first rate representing a dormant mode at a second rate representing an active mode;
   said controller means including a control network responsive to activity within said surveillance area to shift said recorder from said normal operation at said first rate representing a dormant mode to said second rate representing an active mode;
   said controller means further including a variable time lapse signal generator to adjust said recorder to operate with a selected time lapse between successive recorded image signals; wherein said variable time lapse signal generator only if said controller means is in said dormant mode and
   wherein said time lapse signal generator is variable to adjust said recorder to operate with a random time lapse between successive recorded image signals.

* * * * *

UNITED STATES PATENT AND TRADEMARK OFFICE
CERTIFICATE OF CORRECTION

PATENT NO.   : 5,402,167
DATED        : March 28, 1995
INVENTOR(S)  : Eli Einbinder It is certified that error appears in the above-indentified patent and that said Letters Patent is hereby corrected as shown below:

Column 4, line 59, after "generator" add --is enabled--.

Signed and Sealed this

Fourteenth Day of May, 1996

Attest:

BRUCE LEHMAN

*Attesting Officer*         *Commissioner of Patents and Trademarks*